(12) United States Patent
Morishima et al.

(10) Patent No.: US 7,572,302 B2
(45) Date of Patent: Aug. 11, 2009

(54) SHEET-LIKE CHEMICAL CELL, FUEL CELL AND METHODS FOR MANUFACTURING THEREOF

(75) Inventors: Makoto Morishima, Tokyo (JP); Tomoichi Kamo, Tokyo (JP)

(73) Assignee: Hitachi Ltd., Tokyo (JP)

( * ) Notice: Subject to any disclaimer, the term of this patent is extended or adjusted under 35 U.S.C. 154(b) by 733 days.

(21) Appl. No.: 11/062,598

(22) Filed: Feb. 22, 2005

(65) Prior Publication Data

US 2005/0172482 A1 Aug. 11, 2005

Related U.S. Application Data

(62) Division of application No. 10/687,600, filed on Oct. 20, 2003, now Pat. No. 7,323,266.

(30) Foreign Application Priority Data

Oct. 22, 2002 (JP) ............................. 2002-306574

(51) Int. Cl.
*H01M 6/00* (2006.01)
(52) U.S. Cl. .................... 29/623.3; 29/623.2; 29/623.1
(58) Field of Classification Search ............... 29/623.1, 29/623.2, 623.3, 730; 228/179.1, 58, 176, 228/180.5
See application file for complete search history.

(56) References Cited

U.S. PATENT DOCUMENTS 6,083,638 A * 7/2000 Taniguchi et al. ............ 429/34

FOREIGN PATENT DOCUMENTS

| JP | 06-131918 | 5/1994 |
|---|---|---|
| JP | 08-130023 | 5/1996 |
| JP | 9-223507 | 8/1997 |
| JP | 2000-268835 | 9/2000 |
| JP | 2000-268836 | 9/2000 |
| JP | 2000-285504 | 10/2000 |
| JP | 2002-056855 | 2/2002 |
| JP | 2002-110215 | 4/2002 |
| JP | 2002-280016 | 9/2002 |
| JP | 2002-544650 | 12/2002 |
| JP | 2003-197225 | 7/2003 |
| JP | 2004-014322 | 1/2004 |
| JP | 2004-047397 | 2/2004 |
| WO | WO 00/69011 | 11/2000 |
| WO | WO 01/95406 | 12/2001 |
| WO | WO 02/059996 | 8/2002 |

* cited by examiner

*Primary Examiner*—Raymond Alejandro
(74) *Attorney, Agent, or Firm*—Antonelli, Terry, Stout & Kraus, LLP.

(57) ABSTRACT

Disclosed is a sheet-like chemical cell including a plurality of unit cells each of which comprises an electrolyte membrane, a plurality of anode plates on one surface of the electrolyte membrane, and a plurality of cathode plates on the other surface of the electrolyte membrane, with the anode and the cathode plates opposed to each other in pairs with the membrane therebetween. Slots are provided in the electrolyte membrane between adjacent anodes and adjacent cathodes, and cathode and anode wiring layers, on thermoplastic sheets, are provided to sandwich the electrolyte membrane. forming a laminate. The laminate is heat-crimped, with wiring layers on both sides of the membrane being electrically connected through the slots, and thermoplastic resin, of the thermoplastic sheets, filling the slots. Also disclosed are methods of making such cells.

5 Claims, 5 Drawing Sheets

SHEET-LIKE CHEMICAL CELL, FUEL CELL AND METHODS FOR MANUFACTURING THEREOF

This application is a Divisional application of prior Application No. 10/687,600, filed Oct. 20, 2003, the contents of which are incorporated herein by reference in their entirety. Ser. No. 10/687,600 has issued as U.S. Pat. No. 7,323,266, issued Jan. 29, 2008.

BACKGROUND OF THE INVENTION

1. Field of the Invention

This invention relates to a new sheet-like chemical cell and a manufacturing method thereof, a fuel cell and a manufacturing method thereof.

2. Related Art

Thanks to the progress of recent electronic technologies, electronic devices such as mobile telephone sets, book-type personal computers, audiovisual equipment, and mobile information terminal equipment have been downsized and become rapidly widespread as portable electronic devices. Conventionally, such portable electronic devices are systems driven by secondary batteries. The secondary batteries have been developing in the order of sealed lead-acid battery, Ni—Cd battery, nickel metal-hydride battery, and lithium-ion battery, that is, thanks to miniaturization, weight saving, and high energy density technologies. To prolong service lives of these secondary batteries by one charging, various improvements have been made such as development of battery activating materials and high-capacity storage structure to increase their energy densities.

However, the secondary batteries require recharging after a preset quantity of power is used and consequently, they require charging devices and comparatively long charging periods. The portable electronic devices must solve these problems. The coming portable electronic devices will require power supplies of higher energy densities and longer running periods per recharging as they must process greater amounts of information at higher processing rates. In other words, the world is expecting smaller power generators (or micro generators) that need no recharging.

As one of such power generators that meet the above requirements, a fuel cell power supply has been discussed. A fuel cell converts chemical energy of fuel directly into electric energy (electrochemically) and requires no engine section although a conventional engine generator uses an internal combustion engine. Accordingly, the fuel cell has a high possibility as a compact power generating device. Further, the fuel cell need not stop the operation of the portable electronic device temporarily for recharging as frequently shown in the use of secondary batteries as it keeps on generating power as long as fuel is supplied to the fuel cell.

A polymer electrolyte fuel cell (PEFC) is well known as a high current density cell to meet the above requirements. The PEFC comprises an electrolyte membrane made of perfluorocarbon sulfonate resin, an anode, and a cathode and generates electricity by oxidizing the hydrogen gas at the anode and reducing the oxygen gas at the cathode. To make this PEFC smaller, for example, Japanese Patent Laid-open09-223507 discloses a small PEFC power generating device comprising a cylindrical cell assembly which has an anode and a cathode respectively on the inner and outer surfaces of a hollow fiber electrolyte wherein hydrogen gas and air are supplied respectively to the inside and the outside of the cylinder.

However, as a hydrogen gas is used as the anode gas and its volumetric energy density is low, the fuel tank must be greater when the small PEFC power generating device is applied as a power source to a portable electronic device. Further, this power generating system requires auxiliary machines to supply fuel gas and oxidizing gas (e.g. air) to the electrolyte membrane in order to maintain the performance of the cell. Finally, this makes the power generating system complicated and it cannot be said that the cell is small enough.

To increase the volumetric energy density of fuel, it is effective to use a liquid fuel and to simplify the cell structure (e.g. by eliminating the auxiliary machines to supply fuel and oxidizing agent to the cell). For this purpose, some proposals have been made. Japanese Patent Laid-open 2000-26885 and Japanese patent Laid-open 2000-268836, which are the latest examples propose a direct methanol fuel cell (DMFC) which uses methanol and water as the fuel.

The DMFC comprises a liquid fuel container, a material, which can supply liquid fuel by the capillary action on the outer wall of the container, an anode in contact with the material, a polymer electrolyte membrane, and a cathode, the members being disposed in that order. As oxygen is supplied by dispersion to the outer surface of the cathode, which is in contact with the outside air, this type of power generation device does not require any auxiliary machine to supply the fuel and the oxidizing agent. This simplifies the fuel cell system. The DMFC has a feature that the unit cells can be connected in series feature that the unit cells can be connected in series simply by electrical connections and require no cell connecting part such as a separator. However, when the DMFC is connected to a load, the output voltage of a unit cell is very low (0.3 to 0.4V). Therefore, to generate an output voltage available to portable electronic devices, you must connect unit cells in series using a plurality of fuel tanks for the cells.

SUMMARY OF THE INVENTION

As described above, the conventional portable fuel cell comprises a plurality of unit cells each of which has the cathode placed on the outer surface and the anode placed on the inner surface. These unit cells are serially connected in the anode-to-cathode manner to generate a voltage available to portable electronic equipment. Further, their manufacturing method is very complicated and time-consuming because the unit cells must be electrically connected in series in the anode-to-cathode manner. As the number of unit cells to be connected increases, this problem becomes more distinct. Further in this case, each unit cell must be sealed to prevent leaks, which limits the packing density of unit cells. As the result, this limits the energy density of the cell.

Accordingly, it is an object of this invention to provide a sheet-like chemical cell of a simple and easy-fabricated structure having a small quantity of parts that can improve the energy density strikingly, a manufacturing method thereof, a fuel cell, and as manufacturing method thereof.

This invention is related to a fuel cell generating device which comprises an anode, an electrolyte membrane, and a cathode and generates electricity by oxidizing the fuel at the anode and reducing the oxygen gas at the cathode, particularly a fuel cell for portable electronic equipment which uses liquid fuel such as an aqueous methanol solution as the fuel.

This invention relates to a sheet-like chemical cell or a sheet-like electrolyte-electrode cell assembly including a plurality of unit cells each of which comprises an electrolyte membrane, a plurality of anode plates which oxidizes fuel on one surface of said electrolyte membrane, and a plurality of cathode plates which reduces oxygen on the other surface of said electrolyte membrane with said anode and cathode plates opposed each other in pairs with the membrane therebetween.

Further, the membrane has a plurality of slots each of which is provided between every two adjoining electrodes of the same type to electrically connect the opposing anode and cathode plates through these slots. In the completed electrolyte-electrode cell assembly sheet, these slots are sealed with an insulating material.

The fuel cell power generating device has this electrolyte-electrode cell assembly sheet with its anode side in contact with the fuel supply section and uses liquid fuel, particularly aqueous alcohol solution as the fuel.

This electrolyte-electrode cell assembly sheet is manufactured by forming a plurality of anode plates on one surface of the electrolyte membrane and a plurality of cathode plates on the other surface of the electrolyte membrane, forming a slot between every two adjoining electrodes of the same type, electrically connecting the adjoining anode and cathode plates with these slots, sealing these slots with an insulating material, or sandwiching this electrolyte-electrode cell assembly sheet between two thermoplastic sheets having wiring layers on them to electrically connect these wiring layers through slots on the electrolyte membrane and fixing the sheets firmly by fusion-connection of the plastic sheets.

The unit cells are electrically connected in series, in parallel, or both to output desired high voltages and currents.

The fuel cell of this invention can run portable electronic equipment such as mobile telephone sets, portable personal computers, audiovisual equipment, and other mobile information terminal equipment longer when used as a battery charger to recharge the equipment while the equipment is not running or as a built-in power supply instead of the secondary battery, or continuously by replenishing the fuel.

The electrolyte-electrode cell assembly sheet of this invention has a plurality of electrodes on a single electrolyte membrane. They can be manufactured by direct screen-printing on the electrolyte membrane or screen-printing electrodes on a mold releasing film and transferring them onto the electrolyte membrane by thermal compression using a hot press and the like.

The anode catalyst constituting the power generation section can be carbon grains (carriers) impregnated with a mixture of platinum particles and ruthenium particles or platinum-ruthenium alloy particles and the cathode catalyst can be carbon grains (carriers) impregnated with platinum particles. These catalyst materials are easily manufactured and available. However, the catalyst materials are not limited. Any catalyst material can be used for anodes and cathodes of this invention as long as they are used for normal direct oxidation fuel cells. For stabilization and longer service lives, it is preferable to add a third or fourth ingredient selected from a group of iron, tin, and rare-earth elements to the above precious metal components.

As this invention is not limited to the electrolyte membrane, a proton conductive membrane is also available. Typical membrane materials are sulfonated or alkylene-sulfonated fluorine polymers such as perfluorocarbon sulfonic acid resin and polyperfluorostyrene sulfonic acid resin, polystyrene, polysulfon, polyether sulfon, polyetherether sulfon, polyetherether ketone, and other sulfonated hydrocarbon polymers. Among these electrolyte membrane materials, materials that has a low methanol permeability are preferable because they can use fuel more effectively without causing a cell voltage drop due to fuel crossover.

It is also possible to make the fuel cell work in high temperature ranges by using a complex electrolyte membrane prepared by finely impregnating a thermo-stable resin with proton-conductive inorganic material such as tungsten oxide hydrate, zirconium oxide hydrate, tin oxide hydrate, silicotungstic acid, silicomolybdic acid, tungstophosphoric acid, molybdophosphoric acid, etc. As long as an electrolyte membrane has a high proton conductivity and a low methanol permeability, the fuel utilization ratio of the fuel cell becomes high. Consequently, downsizing and long service life, which are the effect of this invention can be fully accomplished.

Generally, a hydration type acid electrolyte membrane is subject to deformation due to repetitive swelling (when the membrane is wet) and shrinkage (when the membrane is dry). Further it sometimes happens that the mechanical membrane strength is not enough when the electrolyte membrane has a high ion conductivity. To increase the mechanical strength of the electrolyte membranes and assure the reliability of the cell performance, various effective methods are available such as chemically bridging the electrolyte membranes, lining the electrolyte membranes with a woven or non-woven cloth having high mechanical strength and heat-resistance, or adding fibers of high mechanical strength and heat-resistance as a filler to the electrolyte membranes.

Further, this invention is characterized in that the electrolyte membrane sheet has a plurality of slots of a predetermined planar shape on the sheet. Furthermore, this invention is characterized in that the plastic sheet has a plurality of wiring layers of a predetermined shape formed at equal intervals thereon and that the wiring layers and the layer areas of the sheet have a plurality of through holes thereon. As explained above, this invention provides new electrolyte membrane sheets and new wiring sheets for a new fuel cell structure.

The power generation structure in accordance with this invention enables realization of a simple power generation system without any auxiliary machine to supply fuel and oxidizing agent. Further, as the power generation system uses, as liquid fuel, an aqueous methanol solution of a high volumetric energy density, the system can generate power longer (per container capacity) than the system uses hydrogen gas in a fuel container of the same capacity. Furthermore, by replenishing the fuel, the system can generate power continuously without a break for recharging from which a secondary battery cannot be free.

The fuel cell of this invention can run portable electronic equipment such as mobile telephone sets, portable personal computers, portable audiovisual equipment, and other mobile information terminal equipment longer when used as a battery charger to recharge the equipment while the equipment is not running or as a built-in power supply instead of the secondary battery, or continuously by replenishing the fuel.

DETAILED DESCRIPTION OF THE INVENTION

DESCRIPTION OF THE PREFERRED EMBODIMENTS

In the following examples are described several preferred embodiments to illustrate this invention. However, it is to be understood that the invention is not intended to be limited to the specific embodiments

Embodiment 1

Figure 1:
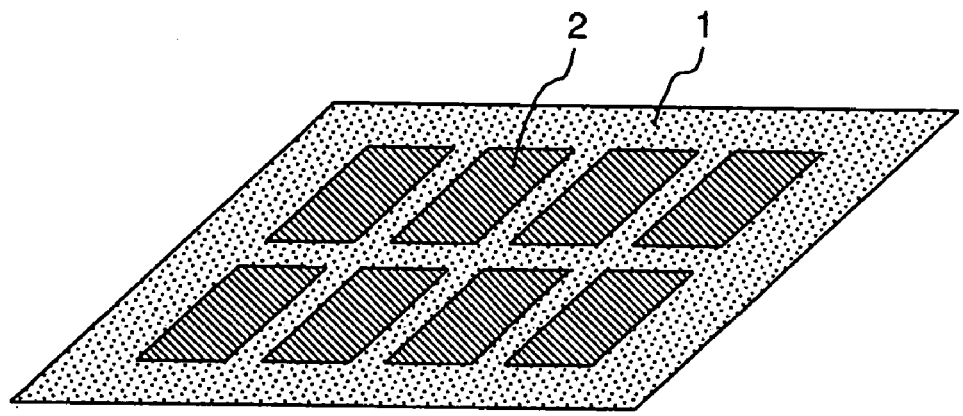
FIG. 1 is a perspective view of an electrolyte-electrode cell assembly to which this invention relates.
Figure 2:
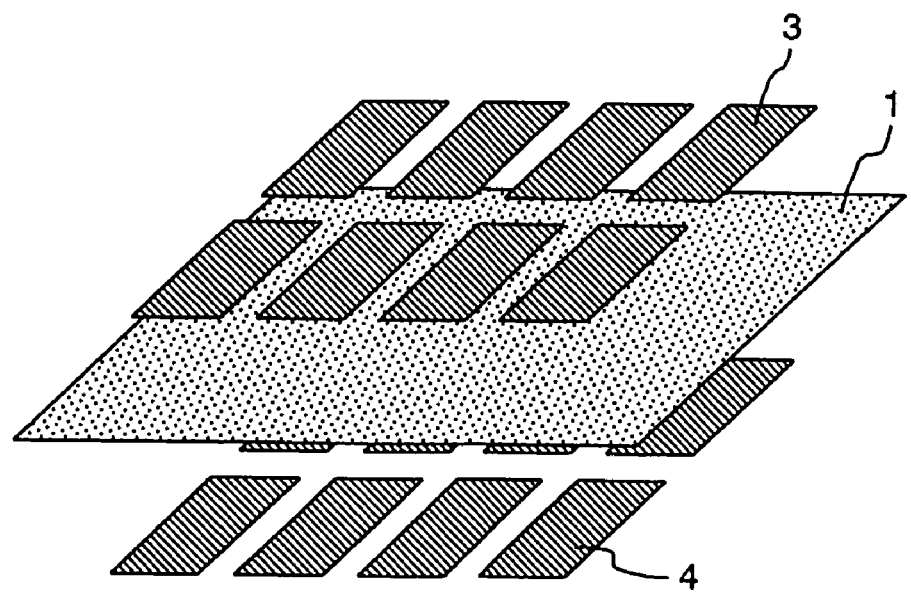
FIG. 2 is a perspective view of an electrolyte-electrode cell assembly to which this invention relates.

FIG. 1 is a perspective view of an electrolyte-electrode cell assembly to which this invention relates. A plurality of electrode plates 2 is formed on each surface of a single electrolyte membrane 1. FIG. 2 is an exploded perspective view of an electrolyte-electrode cell assembly of FIG. 1. The electrolyte membrane 1 has a plurality of cathode plates 3 that reduces oxygen on one surface of said electrolyte membrane 1 and a plurality of anode plates 4 which oxidizes fuel on the other surface of said electrolyte membrane. These electrode plates can be manufactured by direct screen-printing on the electrolyte membrane or screen-printing electrodes on a mold releasing film and transferring them onto the electrolyte membrane by thermal compression using a hot press and the like.

The inventors formed anode plates (porous membranes) 4 of about 20 microns thick on a polytetrafluoroethylene film by screen-printing a slurry comprising catalyst particles prepared by impregnating carbon carriers with 50% by weight of Pt—Ru alloy particles having 1 part of platinum and 1 part of ruthenium (in atomic ratio), 30% by weight of perfluorocarbon sulfonic acid (Du Pont NAFION117) as a binder, and a mixture of water and alcohol (20 parts water, 40 parts isopropanol, and 40 parts of normal isopropanol by weight) as a solvent.

Similarly, we formed cathode plates (porous membranes) 3 of about 25 microns thick on a polytetrafluoroethylene film by screen-printing a slurry comprising catalyst particles prepared by impregnating carbon carriers with 30% by weight of platinum particles, the electrolyte as a binder, and a mixture of water and alcohol as a solvent.

We prepared the catalyst particles by dispersing Pt—Ru alloy particles and platinum particles of 5 nm in grain size over the surfaces of carbon particles of 30 to 60 nm in grain size by electroless plating while controlling the plating time, the reduction speed, and so on.

We prepared anode plates 4 (porous membranes) and cathode plates 3 (porous membranes) by cutting out anode plates of 10 mm wide by 20 mm long and cathode plates of 10 mm wide by 20 mm long respectively from the above polytetrafluoroethylene films, and removing polytetrafluoroethylene films from the back of the plates. Then, we cut out a NAFION117 (trademark of DuPont for perfluorinated ion exchange membranes) sheet of 70mm wide by 60mm long as the electrolyte membrane 1 and placed eight anode plates in a 2 by 4 array at equal intervals on one surface of the cut-out NAFION117 sheet and eight cathode plates on the other side of the NAFION 117 sheet in the similar manner with the anode plates and the cathode plates matched with the NAFION117 sheet therebetween as shown in FIG. 2. We sandwiched this electrode-membrane assembly between two 1mm-thick polytetrafluoroethylene sheets and hot-pressed this at 140° and about 5 MPa for 4 minutes. After hot-pressing thereof, we removed the polytetrafluoroethylene sheets and got a sheet-like electrode-membrane assembly.

Embodiment 2

Figure 3:
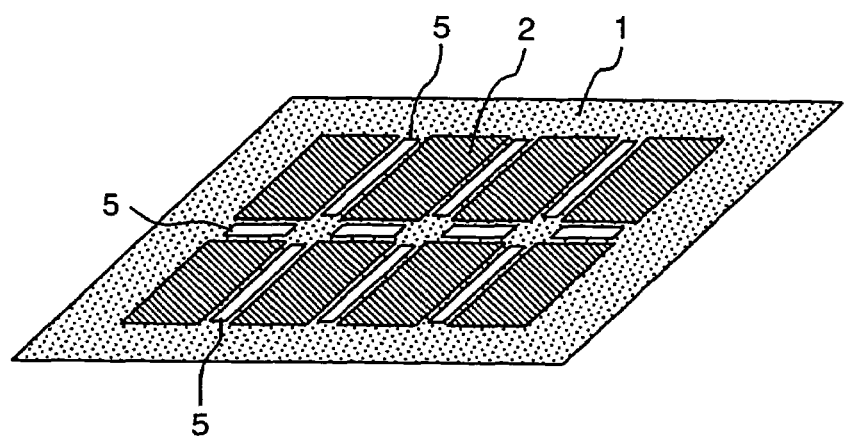
FIG. 3 is a perspective view of an electrolyte-electrode cell assembly, which is the first embodiment of this invention.

FIG. 3 is a perspective view of a sheet-like electrolyte-electrode cell assembly of Embodiment 1 which has slots 5 to electrically connect unit cells in series on the electrolyte membrane 1. As shown in FIG. 3, a slot is independently provided between every two adjoining electrodes of the same type on the electrolyte membrane 1. These slots also work to prevent short-circuiting of adjoining two electrodes by ions.

To electrically connect these unit cells in series, connect the upper unit cells from right to left using the slots, connect the leftmost upper unit cell to the leftmost lower unit cell using a slot between them, connect the lower unit cells from left to right using the slots until the rightmost lower unit cell is connected to the EXT terminal. In this case, three slots between three upper right unit cells and three lower right unit cells are not used for electrical connection and filled with resin. Slots can be formed on the electrolyte membrane 1 before or after the electrodes are formed.

Figure 4:
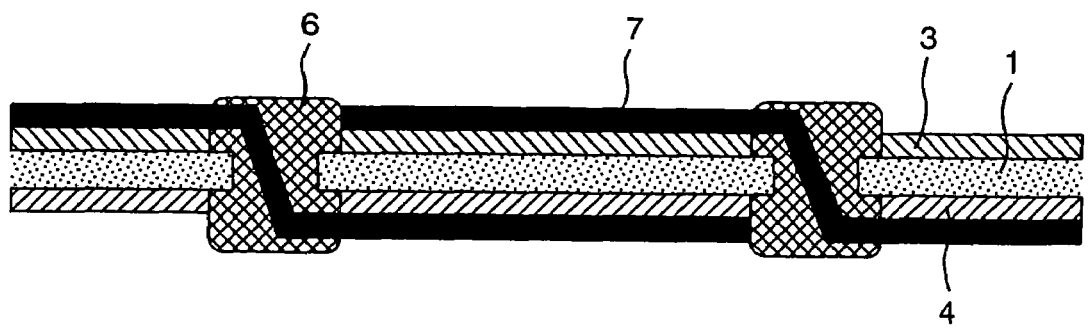
FIG. 4 is a cross-sectional view of the electrolyte-electrode cell assembly having wiring layers thereon in accordance with the first embodiment.

FIG. 4 is a cross-sectional view of the electrolyte-electrode cell assembly showing how the unit cells are electrically connected in series using current collecting plates. We disposed thin current-collecting plates 7 of a preset planar shape in place on the anode plates and cathode plates respectively with one edge of the current-collecting plate put in a slot between every two unit cells to electrically connect each anode plate 4 to the next cathode plate 3 in sequence, filled the slots with an insulating sealing resin 6 to assure insulation of unit cells and to prevent fuel leaks, and covered the whole assembly with a plastic sheet.

With this, we obtained a sheet-like electrolyte-electrode cell assembly whose unit cells are electrically connected. Each current-collecting plate 7 has almost the same planar shape as each electrode plate. Its areas fit for the electrodes and the plastic sheets have fine through-holes to flow fuel gases therethrough.

Embodiment 3

Figure 5:
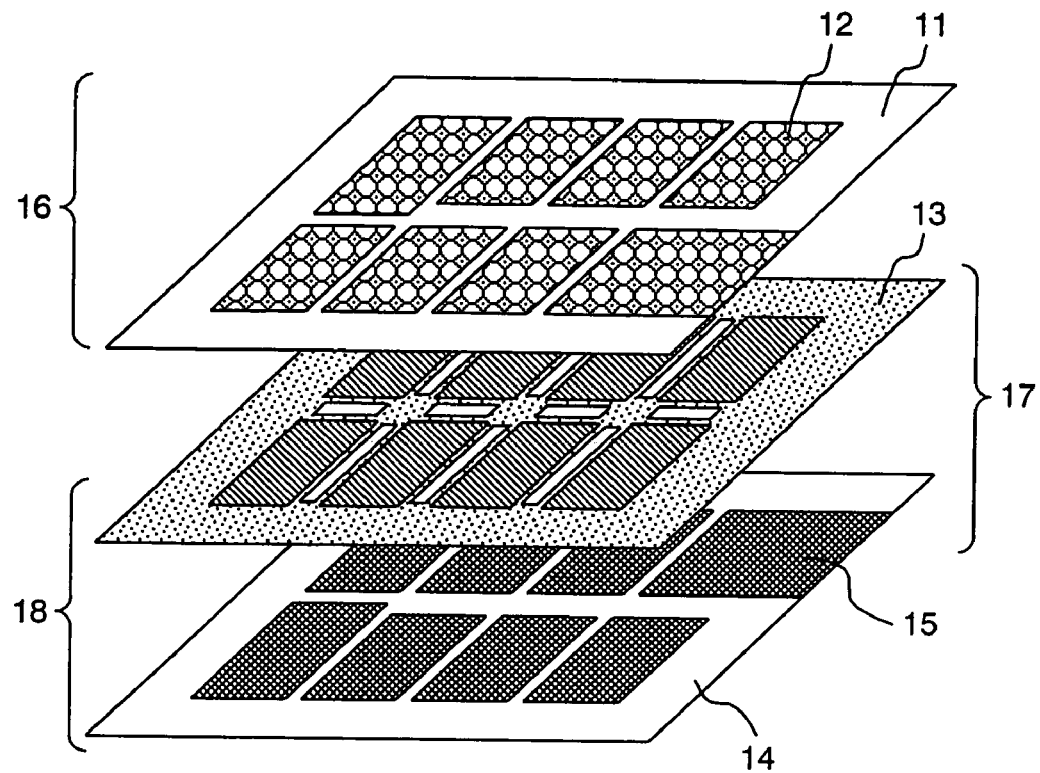
FIG. 5 is a perspective view of the electrolyte-electrode cell assembly having wiring layers thereon in accordance with the second embodiment.

FIG. 5 is a perspective view of the sheet-like electrolyte-electrode cell assembly. We formed slots 5 (a slot between every two adjoining unit cell electrodes) on the electrolyte membrane 13 of the sheet-like electrolyte-electrode cell assembly 17 of Embodiment 1 as shown in FIG. 3 to electrically connect unit cells in series.

Then we took the steps of plating a copper conductive layer on separate thermoplastic sheets 11, 14 and a gold or platinum layer over the copper layer, etching cathode wiring layers 12 of a preset planar shape to be matched with the aforesaid cathode plates 3, shown in FIG. 4, on one of the plated thermoplastic sheets to form a cathode wiring sheet 16, etching anode wiring layers 15 of a preset planar shape to be matched with the aforesaid anode plates 4, shown in FIG. 4, on the other plated thermoplastic sheet to form an anode wiring sheet 18, sandwiching the sheet-like electrolyte-electrode cell assembly 17 between these anode and cathode thermoplastic sheets with the etched wiring layers matched respectively with the cathode and anode plates on the cell assembly 17, sandwiching this assembly between two polytetrafluoroethylene films, and hot-pressing thereof by a laminator.

With this, we got the sheet-like electrolyte-electrode cell assembly 17 having wiring layers. Fine through-holes are made by punching or etching on cathode wiring layers 12 on the cathode wiring sheets 16, anode wiring layers 15 on the anode wiring sheets 18, and the corresponding areas of the thermoplastic sheets to supply the fuel to the anode plates 4 and oxygen to the cathode plates.

The cathode wiring layers 12 and the anode wiring layers 15 are connected in series in the manner similar to the serial electrical connection of FIG. 3. They are a little shifted from each other so that they may intersect and connect with each other in the slots when the sheets are attached together.

Figure 6:
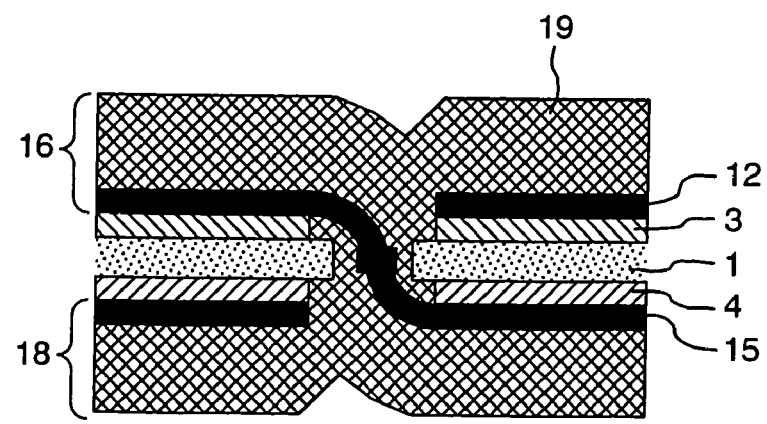
FIG. 6 is a cross-sectional view of the electrolyte-electrode cell assembly having wiring layers thereon in accordance with the second embodiment.

FIG. 6 is a cross-sectional view of the electrolyte-electrode cell assembly having wiring layers 12, 15 thereon. The cathode wiring layers 16 and the anode wiring layers 18 are respectively formed on the thermoplastic sheets so that they may be overlapped with each other at the slots 5 that are formed on the electrolyte membrane to electrically connect the abode plates 4 and cathode plates 3 in series. When hot-compressed by the laminator, the wiring layers are made in contact and connected with each other in the slots.

At the same time, the slots 5 are filled with resin of the thermoplastic resin layer 19. When the thermoplastic resin becomes cold and set, the upper and lower wiring sheets are bonded together and the wiring layers are connected firmly. At the same time, the thermoplastic resin works to insulate the slots 5 and prevent leaks of fuel from the slots. This embodiment can make all electric connections at a time and bond the whole peripheries of the wiring sheets together except the EXT terminal areas.

Embodiment 4

Figure 7:
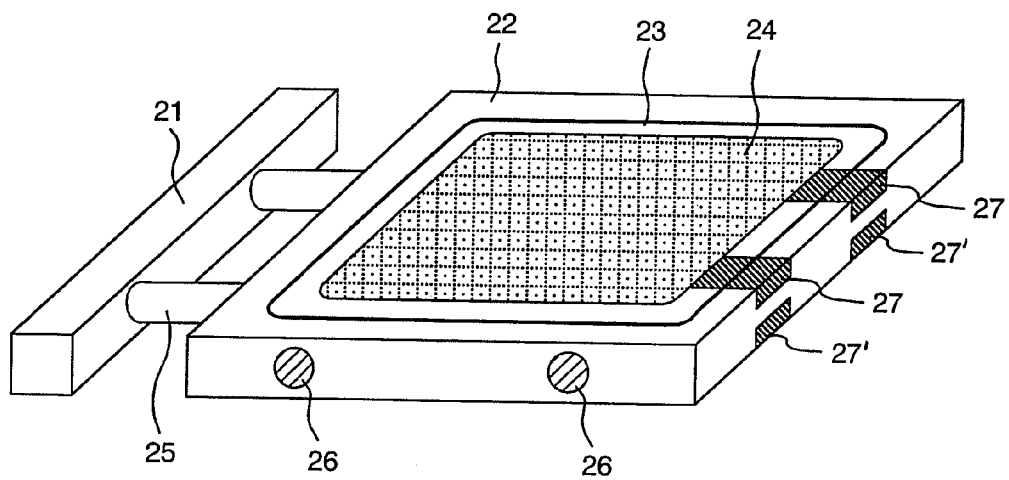
FIG. 7 is a perspective view of a set of a fuel cartridge and a fuel supply section in accordance with the third embodiment.

FIG. 7 is a bird's-eye view of a fuel supply section, which uses the electrolyte-electrode cell assembly of this invention. The unit of FIG. 7 comprises a fuel supply section 22 which supplies fuel to the electrolyte-electrode cell assemblies equipped with wiring layers, a replaceable fuel cartridge 21 which stores fuel, and liquid pipes 25 which connect the fuel supply section 22 and the replaceable fuel cartridge 21. The fuel supply section 22 contains a fuel cell assembly of Embodiment 1 on each side of the fuel supply section 22.

The fuel supply section 22 contains a porous material to disperse liquid fuel uniformly by the capillary action and supplies liquid fuel to every unit cell through the opening 24. The fuel supply section has an elastomeric seal 23 to prevent fuel leaks, an external anode terminal 27 and an external cathode terminal 27' to take out electricity from the fuel cell on each of the front and rear sides of the fuel supply section. The fuel supply section also has a plurality of gas-liquid separating membranes 26 on the sides of the fuel supply section to escape gas generated by power generation to the outside and prevent an internal pressure rise as shown in FIG. 7. Each electrolyte-electrode cell assembly 30 on each side is bonded to the fuel supply section 22 at the periphery by adhesives or hot-compression.

Figure 8:
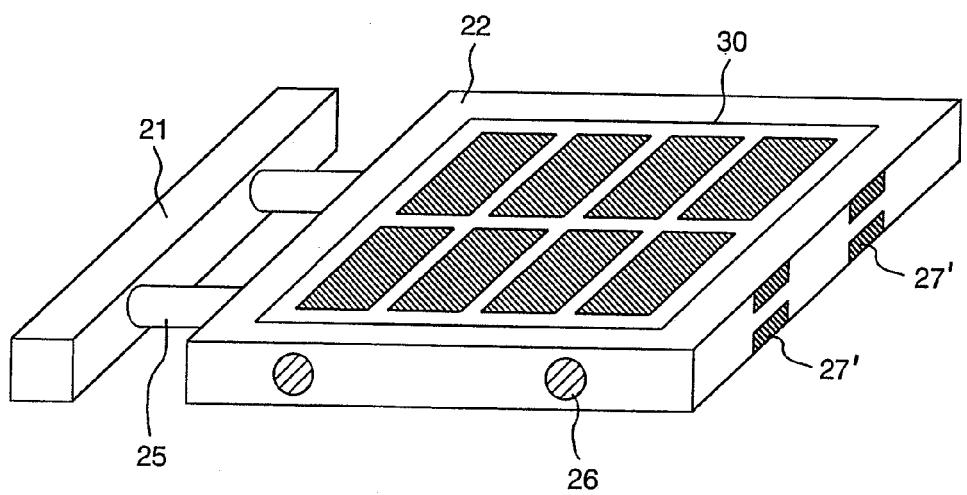
FIG. 8 is a perspective view of a fuel cell in accordance with the third embodiment.

FIG. 8 is a birds-eye view of the fuel supply section on which the fuel cell assemblies are bonded. As shown in FIG. 8, the sheet-like electrolyte-electrode cell assembly 30 having wiring layers prepared by Embodiments' 2 and 3 is bonded to each side of the fuel supply section 22. We supplied an aqueous methanol solution containing 5% by weight methanol to this cell assembly in which 16 unit cells were connected in series. We obtained an output of about 150 mW and a voltage of 3.2 V.

COMPARATIVE EXAMPLE 1

Figure 9:
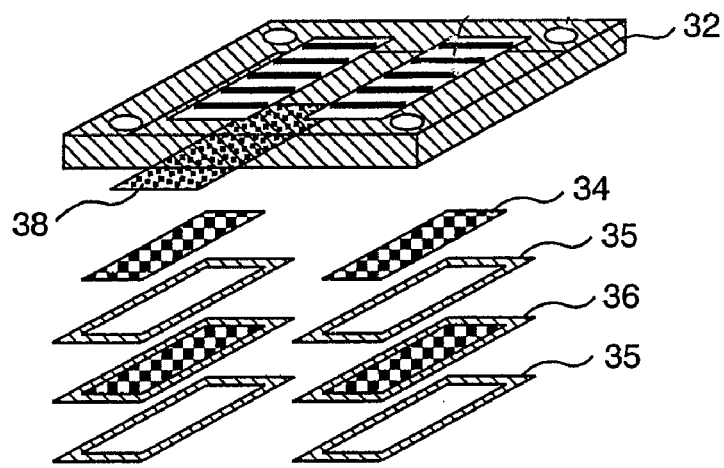
FIG. 9 is an exploded perspective view of a fuel cell in accordance with the first comparative example.
Figure 10:
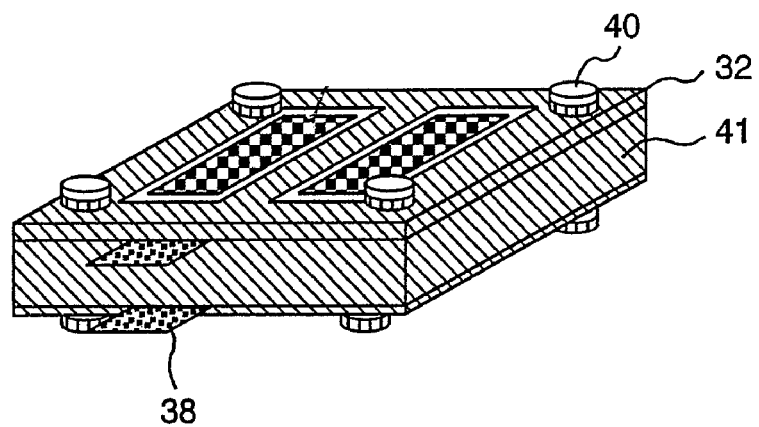
FIG. 10 is a perspective view of the whole fuel cell in accordance with the first comparative example.

FIG. 9 is an exploded perspective view of an example of conventional fuel cell and FIG. 10 shows a bird's-eye view of the assembled fuel cell. In the conventional fuel cell, a unit cell uses one electrolyte-electrode cell assembly 36 and requires a sealing material to prevent a fuel leak from the unit cell. Substantially, an elastomeric sealer 35 is placed on the periphery of each side of the electrolyte-electrode cell assembly. These unit cells are placed in place in a cell storage container 41, electrically connected in series by interconnectors, attaching the diffusion layers 34 and the output terminals 38, covered with cell fixing plates 32, and fixed firmly with screws having a ventilation hole 40.

As explained above, the conventional fuel cell has a complicated structure and lots of parts. Further, positioning of parts in the cell storage container is very difficult. Incorrect part positioning caused not only a power reduction but also a fuel leak. With a supply of an aqueous methanol solution containing 5% methanol as fuel, the conventional cell having four unit cells connected in series output about 20 mW.

A fuel cell assembly in accordance with embodiments explained above comprises a plurality of unit cells each of which comprises an electrolyte membrane having a plurality of anodes on one side of the electrolyte membrane and a plurality of cathodes on the other side of the electrolyte membrane. This simplifies the fuel cell structure, reduces the number of parts, and facilitates assembling. As this also facilitates disassembling the fuel cell assembly, only electrolyte-electrode cell assemblies can be easily taken out from recovered fuel cells for recycling of precious metals. The embodiments simplify fuel cell structures and manufacturing processes and also provides a compact power supply fit for portable equipment without any auxiliary machine. This invention can also provide portable electronic devices using such fuel cells.

What is claimed is:

1. A method for manufacturing a sheet chemical cell, comprising:
    preparing an electrolyte membrane sheet having a plurality of cathode plates on one face thereof and a plurality of anode plates on a face thereof opposed to said one face, and having a slot at positions between every two adjoining cathode plates of the plurality of cathode plates and a slot at positions between every two adjoining anode plates of the plurality of anode plates;
    laminating at least one thermoplastic sheet, having a cathode wiring layer on one face thereof, on said one face of the electrolyte membrane sheet, and laminating at least one thermoplastic sheet, having an anode wiring layer on one face thereof, on said face of the electrolyte membrane sheet opposed to said one face, in such a manner that the cathode wiring layer is in contact with the cathode plates and the anode wiring layer is in contact with the anode plates; and
    hot-crimping a set of the electrolyte membrane sheet having the thermoplastic sheets laminated thereon,
    wherein the plurality of cathode plates and the plurality of anode plates are at opposed locations, on the one face and the face opposed to the one face, of the electrolyte membrane sheet, wherein after said hot-crimping the slots are filled with thermoplastic resin of the thermoplastic sheets, and wherein after the hot-crimping anode and cathode wiring layers are connected via the slots.

2. The method for manufacturing a sheet chemical cell of claim 1, said anode wiring layers and said cathode wiring layers are of the same planar shapes as those of said anode and cathode plates, respectively, with said anode and cathode wiring layers being matched with said anode and cathode plates to be in contact with each other at slot positions, and wherein said hot-crimping includes fusion-bonding said wiring layers together through said slots so that the wiring layers are electrically connected in series.

3. The method for manufacturing a sheet chemical cell of claim 1, wherein said method further comprises forming said slots, and forming two thermoplastic sheets respectively having wiring layers of the same planar shapes as those of said anode and cathode plates, with said wiring layers matched with the anode and cathode plates, and wherein said hot-crimping includes fusion-bonding said wiring layers together through said slots so that the wiring layers are electrically connected in series.

4. A method for manufacturing a fuel cell assembly, comprising the method for manufacturing a sheet chemical cell of claim 1.

5. A method for manufacturing a sheet chemical cell of claim 1, wherein the anode plates are placed to be in contact with either or both surfaces of a fuel supply section including a porous material which diffuses liquid fuel by capillary action.

* * * * *

UNITED STATES PATENT AND TRADEMARK OFFICE
CERTIFICATE OF CORRECTION

PATENT NO. : 7,572,302 B2  Page 1 of 1
APPLICATION NO. : 11/062598
DATED : August 11, 2009
INVENTOR(S) : Morishima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1112 days.

Signed and Sealed this

Seventh Day of September, 2010

David J. Kappos
*Director of the United States Patent and Trademark Office*